(12) United States Patent
Fei

(10) Patent No.: US 6,255,755 B1
(45) Date of Patent: *Jul. 3, 2001

(54) SINGLE PHASE THREE SPEED MOTOR WITH SHARED WINDINGS

(76) Inventor: Renyan W. Fei, 10324 Quaker Dr., St. Louis, MO (US) 63136

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,658

(22) Filed: Jun. 4, 1998

(51) Int. Cl.[7] ............................. H02K 1/00; H02P 1/26; H02P 1/42
(52) U.S. Cl. ..................... 310/184; 310/198; 318/772; 318/774; 318/776
(58) Field of Search ................................. 310/184, 198, 310/166, 168, 171; 318/776, 777, 774, 775, 523, 524, 495, 748, 724, 737, 49, 288, 772; 322/62, 63; 363/104

(56) References Cited

U.S. PATENT DOCUMENTS

| | | | |
|---|---|---|---|
| 1,961,793 | 6/1934 | Schaefer | 172/379 |
| 2,068,559 | 1/1937 | Michelsen | 172/279 |
| 2,820,938 | 1/1958 | Davies | 318/224 |
| 2,896,144 | 7/1959 | Mollenberg | 318/224 |
| 3,167,700 | 1/1965 | Neyhouse | 318/224 |
| 3,233,160 | 2/1966 | Rawcliffe | 318/224 |
| 3,350,614 | 10/1967 | Stout | 318/224 |
| 3,470,407 * | 9/1969 | Richer et al. | 310/166 |
| 3,619,730 | 11/1971 | Broadway et al. | 318/224 R |
| 3,774,062 | 11/1973 | Johnson | 310/184 |
| 3,826,960 * | 7/1974 | Broadway et al. | 318/223 |
| 3,887,854 | 6/1975 | Parks | 318/224 A |
| 4,100,444 * | 7/1978 | Boyd | 310/184 |
| 4,103,212 | 7/1978 | Spradling | 318/224 A |
| 4,296,344 | 10/1981 | Rabe | 310/184 |
| 4,408,150 | 10/1983 | Holston et al. | 318/779 |
| 4,463,303 | 7/1984 | Kirschbaum | 318/776 |
| 4,473,788 * | 9/1984 | Kirschbaum | 318/776 |
| 4,476,422 * | 10/1984 | Kirschbaum | 318/776 |
| 4,486,699 | 12/1984 | Hoemann et al. | 318/772 |
| 4,737,701 | 4/1988 | Hoemann et al. | 318/772 |
| 4,937,513 | 6/1990 | Hoemann et al. | 318/772 |
| 5,227,710 | 7/1993 | Lewus | 318/781 |

OTHER PUBLICATIONS

Design and Test Analysis of Single–Phase Induction Motors with 4–8 Pole Common Winding IEEE Transactions on Industry Applications, vol. 31, No. 6 Nov./Dec. 1995; pp. 1–5.

* cited by examiner

Primary Examiner—Nick Ponomarenko
Assistant Examiner—Dang Dinh Le

(57) ABSTRACT

A single phase, three-speed Pole-changing electric motor has a stator and a rotor rotatably mounted within the stator. The stator includes a core having a plurality of slots, and a plurality of windings in the slots for operating at least three speeds. The windings are configured and arranged so that a substantial portion of the windings used in operating at one speed are used in operating at another speed. The reconnection of windings for different speeds is simple and easy to implement, for example with an external timer, switch, or relay.

5 Claims, 6 Drawing Sheets

SINGLE PHASE THREE SPEED MOTOR WITH SHARED WINDINGS

FIELD OF THE INVENTION

This invention relates to a single phase three-speed induction motor, and in particular to such a motor in which a substantial portion of the windings are shared for operation at different speeds.

BACKGROUND OF THE INVENTION

Multispeed pole-changing single phase motors typically comprise separate windings for operation at each speed. For example, in the case of a three speed induction motor, the stator might include an eight-pole main winding for operation at low speed, a six-pole main winding for operation at medium speed, and a four-pole main winding for operation at high speed. A separate auxiliary winding is often provided for starting the motor. This auxiliary winding is typically a four-pole winding for so-called "hard" starting. In these motors, only a small portion of the windings, the coils under one pole are shared for operation at different speeds. The application of different approaches for winding sharing in the prior art is limited by complicated reconnection which substantially increases the motor cost.

To accommodate a large number of windings in the limited slot size the windings typically are made of copper, which is relatively expensive.

SUMMARY OF TIE INVENTION

The present invention relates to a three speed, pole changing single phase capacitor-start or split phase induction motor in which a substantial portion of the windings for the various speeds are shared through a simple winding reconnection. This leaves more room in the slots, and allows bulkier but less expensive materials (such as aluminum) to be used for the windings. More particularly, the motor of the present invention comprises a stator, and a rotor rotatably mounted within the stator. The stator comprises a core, which is conventionally made of a stack plurality of laminations of a magnetically permeable material. The core has a plurality of slots therein for receiving the windings. According to the present invention, these windings include a first winding, having four coil sections; a second winding having two coil sections; a third winding having two coil sections; a fourth winding having six coil sections; and an auxiliary starting winding having six coil sections.

Shared winding techniques have been proposed before. However, the feasibility of such techniques largely depends on the simplicity of the winding reconnection. The winding configuration of the present invention used the existing starting switch and requires only one additional single pole, single throw contact from a switch outside the motor, such as a timer, relay, electronic switch, etc. As compared with separate winding motors this is very easy and inexpensive to implement.

The windings are connectable to operate in a four pole high speed configuration, a six pole medium speed configuration, and an eight pole low speed configuration. More particularly the first winding, the second winding, and the third winding are arranged in the slots so that they can be connected to operate in a four pole conventional configuration. The second winding and the third winding are also arranged in the slots so that they can be connected to operate in an eight pole consequent configuration. The fourth winding is arranged in the slots so that it can be connected to operate in a six pole conventional configuration. Lastly, the auxiliary winding is arranged in the slots so that it can be operated in a six pole conventional configuration during start-up of the motor.

Because in this preferred embodiment the windings for eight pole operation are fully shared with the windings for four pole operation, there is extra room in the stator slots. This allows a bulkier but lighter material, such as aluminum, to be used for the windings instead of a more compact but heavier materials such as copper. Thus the resultant motor is significantly lighter, not just because of the elimination of a separate winding for operation in the eight pole-mode, but because the space freed up by the elimination of the separate eight pole winding allows a lighter material to be used for the remaining windings. Furthermore, aluminum is considerably less expensive than copper, so the motor is less expensive to manufacture.

These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
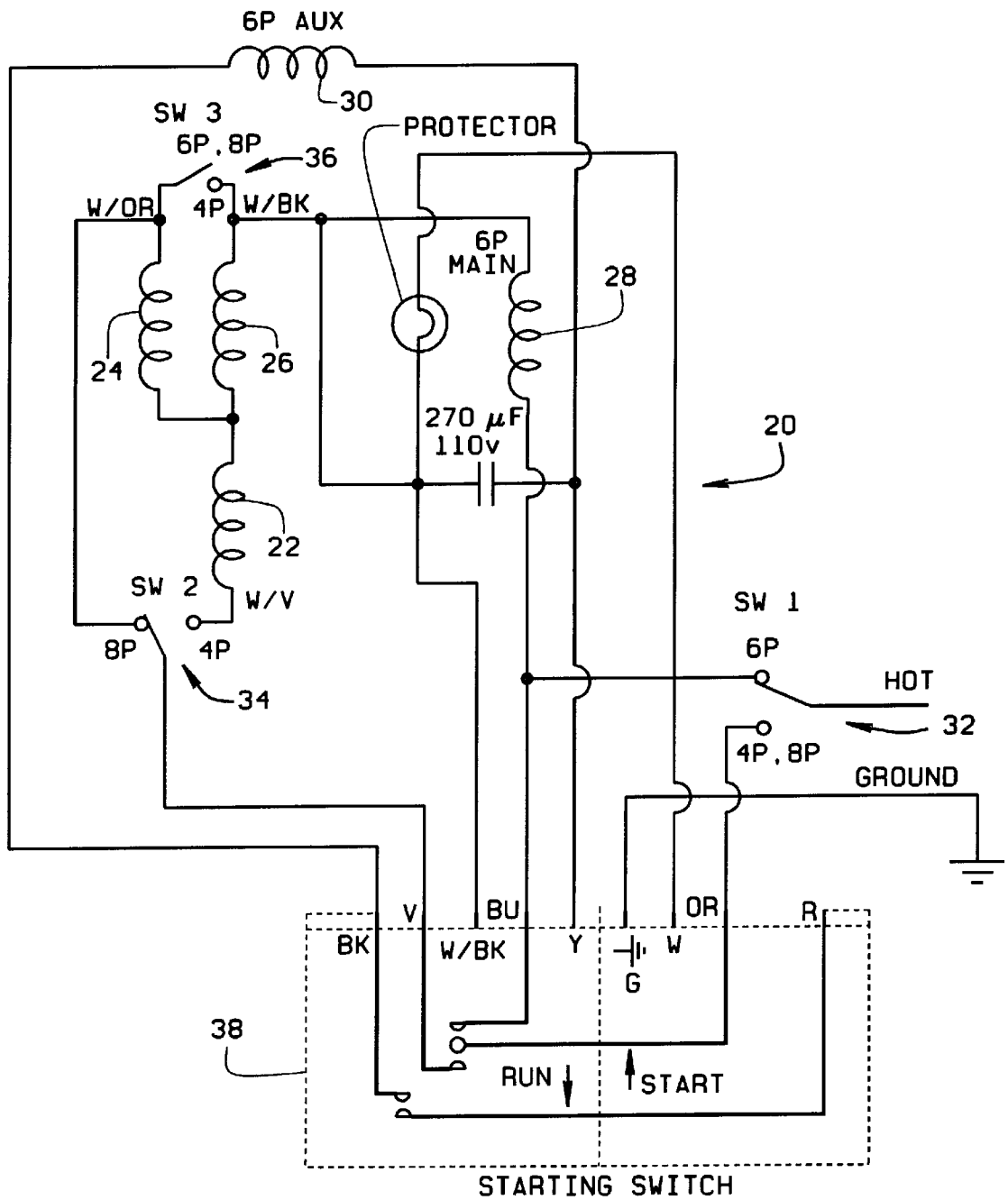
FIG. 1 is a schematic diagram of a three speed single phase electric motor constructed according to the principles of this invention.
Figure 2:
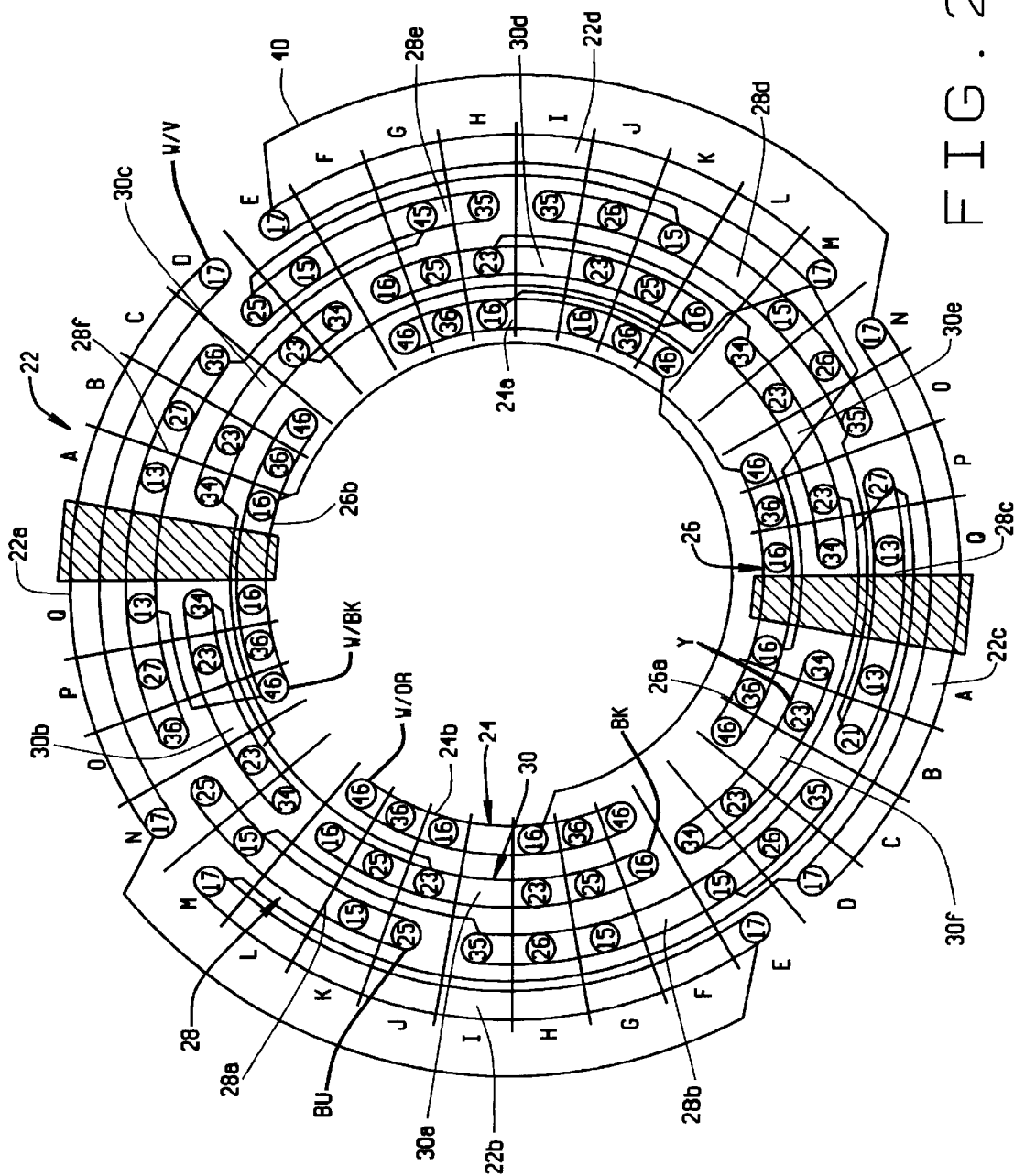
FIG. 2 is a winding diagram of the motor.

A three speed, single phase electric motor constructed according to the principles of the present invention, indicated generally as 20, is shown schematically in FIG. 1. The motor 20 comprises a stator of conventional construction formed of a stack of laminations of a magnetically permeable material, with a plurality of slots for holding windings.

The motor 20 comprises a first winding 22 having four coil sections, a second winding 24 having two coil sections, a third winding 26 having two coil sections, and a fourth winding 28 having six coil sections. The motor also has an auxiliary winding 30 having six coil sections for start up. As shown in FIG. 1, the first coil 22, the second coil 24, and the third coil 26 are arranged to be connected to a power supply to operate in a conventional four pole (high speed) mode. The second coil 24 and the third coil 26 are also arranged to be connected to a power supply to operate in a consequent eight pole (low speed) mode. The fourth winding 28 is configured to be connected to a power supply to operate in a conventional six pole (medium speed) mode. Lastly, the auxiliary winding 30 is configured to be connected to a power supply during start-up with the fourth winding 28, to start the motor.

In this preferred embodiment, all of the windings for operating in the eight pole mode (windings 24 and 26) are windings that are also used to operate in the four pole mode, no separate winding is provided to operate in the eight pole mode. This means that there is additional room in the slots in the stator as compared to other three speed motors. This additional room facilitates manufacture of the motor, and it allows bulkier but less expensive materials such as aluminum to be used for the windings instead of the more expensive copper to reduce the material cost and the motor weight.

The configuration of the winding to operate in the four pole (high speed); six pole (medium speed), and eight pole (low speed) modes, is achieved by switches 32, 34 and 36, which are preferably external to the motor.

Switch 32 operates between a first 6 pole position, and a second 4 pole/8 pole position. Switch 34 operates between a first 4 pole position and second 8 pole position. Switch 36 operates between a first 4 pole position and a second 6 pole/8 pole position. A starting switch 38 is also provided to temporarily connect the six pole main winding 28 and the auxiliary winding 30 to power to start the motor.

The physical arrangement of the windings in the slots in the stator is best shown in FIGS. 2–6. As shown in FIGS. 2–6, the stator core 40 has a plurality of slots (a total of 34 as shown). The first winding 22 comprises four coil sections 22a, 22b, 22c, and 22d, connected in series such that in 4-pole operational mode when the coil sections 22a and 22c form north poles, the coil sections 22b and 22d form south poles. The second winding 24 comprises two coil sections 24a and 24b, connected in series. The third winding 26 comprises two coil sections 26a and 26b, connected in series. In 4-pole operational mode, the winding 24 and 26 are in parallel and both of them together are in series with the winding 22. The winding 24 is positioned in the slots, such that coil section 24a is aligned with coil section 22d and coil section 24b is aligned with coil section 22b. The coil sections 24a and 24b are configured, so that when they are powered in 4-pole operational mode, they will have the same polarity as the coil sections 22d and 22b with which they are aligned. Likewise, the coil sections 26a and 26b are aligned with coil sections 22c and 22a, respectively. The coil sections 26a and 26b are configured, so that when they are powered in 4-pole operational mode, they will have the same polarity as the coil sections 22c and 22a with which they are aligned. In this configuration, the first, second, and third windings cooperate to operate in a conventional four pole mode, with the coil sections 22a and 26b forming a north pole, the coil sections 22d and 24a forming a south pole, coil sections 22c and 26a forming a north pole, and coil sections 22b and 24b forming a south pole.

Figure 3:
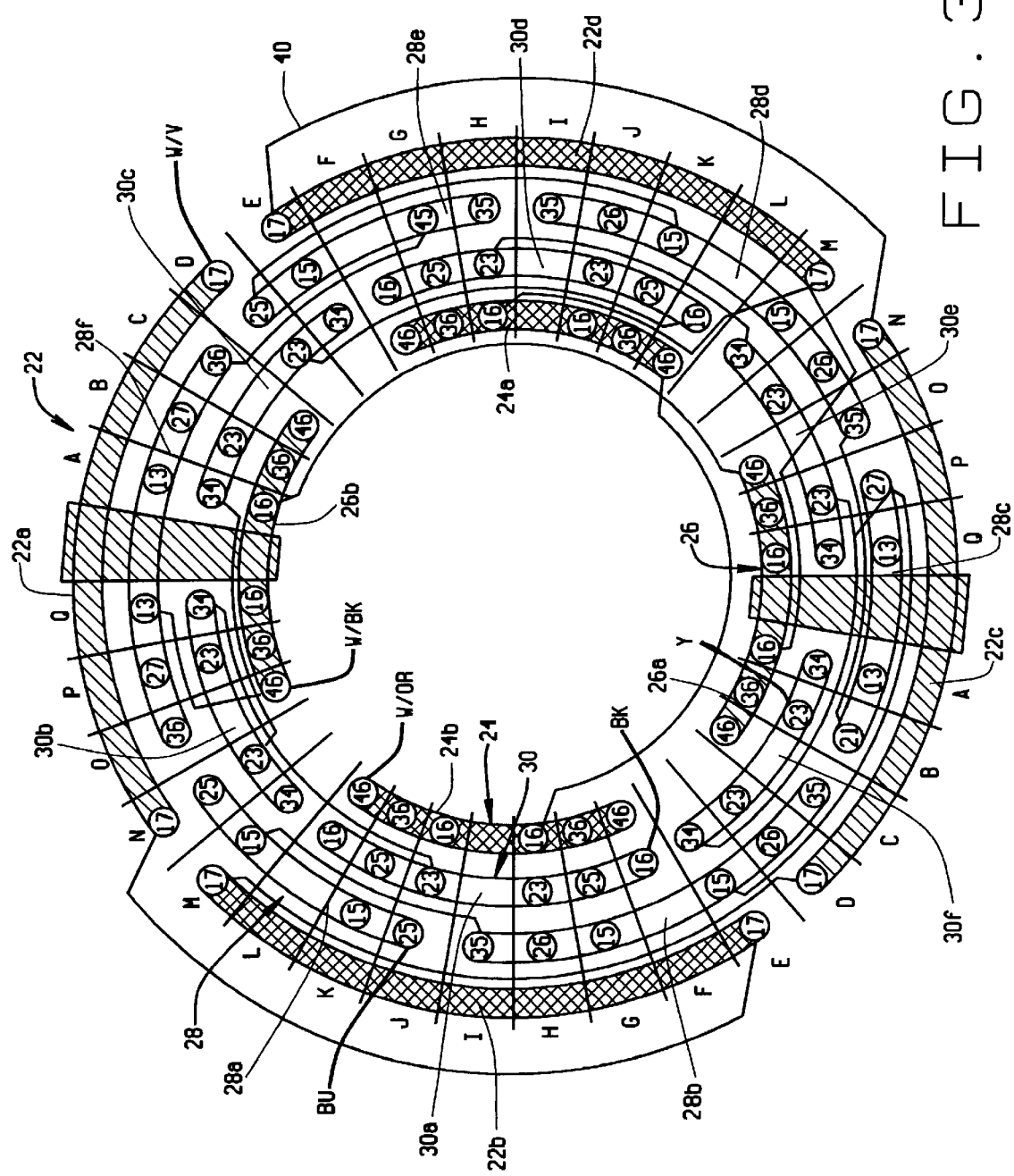
FIG. 3 is a winding diagram of the motor, illustrating the first, second, and third windings connected to operate in a four pole (high speed) mode.
Figure 4:
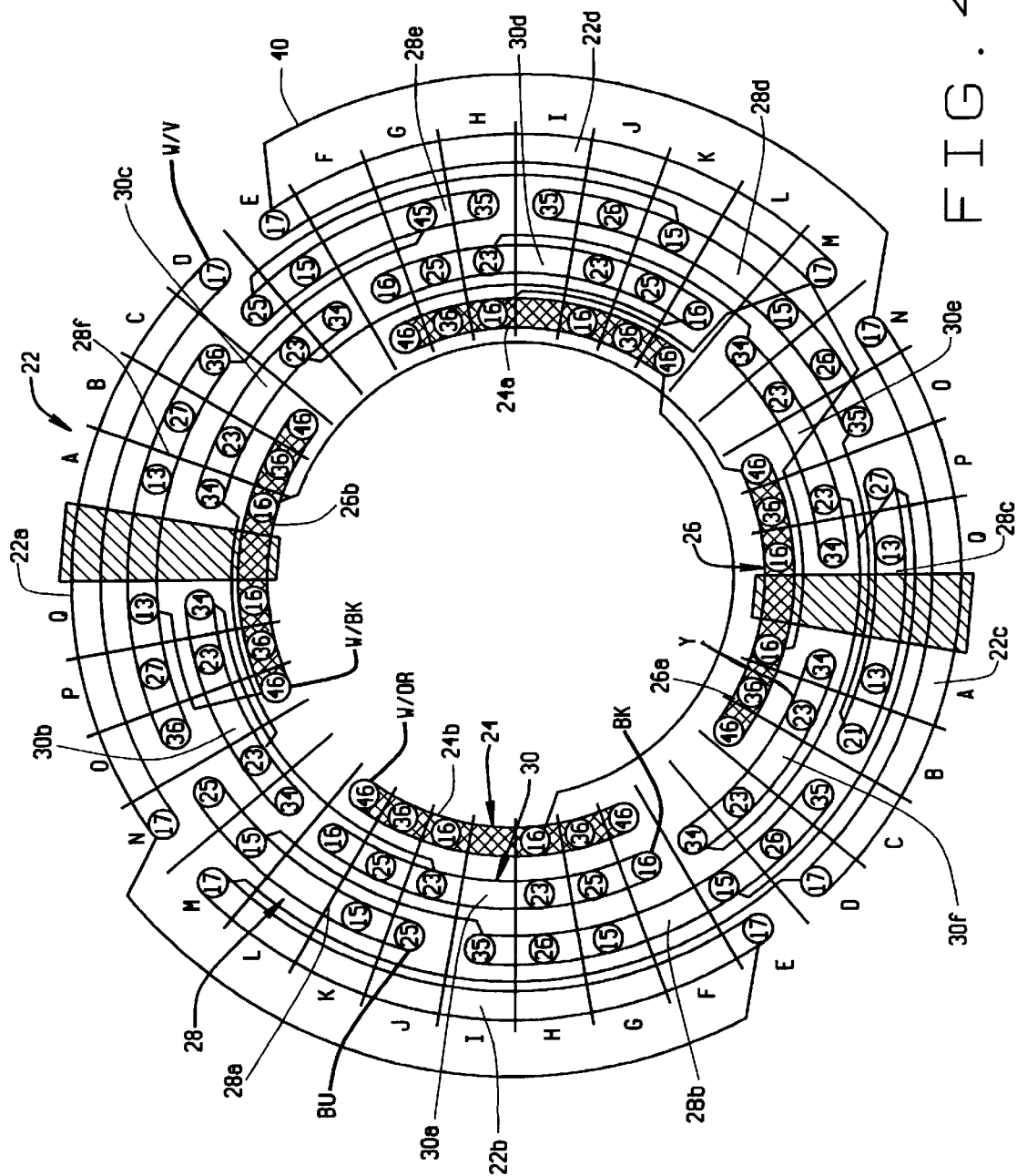
FIG. 4 is winding diagram of the motor, illustrating the second and third windings connected to operate in an eight pole (low speed) mode.

The first, second, and third windings are connected for operation the four pole (high speed) mode, when switch 32 is in the 4 pole/8 pole position, switch 34 is in the 4 pole position, and switch 36 is in the 4 pole position. This configuration is shown in FIG. 3, in which the coil sections forming a north pole are hatched and the coil sections forming a south pole are cross-hatched.

The second and third windings 24 and 26 are also connected in series, and when powered in series, the coil sections 24a and 24b of the second winding, and coil sections 26a and 26b of the third winding all form poles in the same direction, in this case north, which forms an eight pole consequent winding.

When the second and third windings 24 and 26 are connected and powered in series, the coil sections 24a and 24b of the second winding and the coil sections 26a and 26b of the third winding all form poles with the same polarity, (for example all north), which forms an eight pole consequent winding.

The fourth winding 28 comprises winding sections 28a, 28b, 28c, 28d, 28e, and 28f. The coil sections are configured and connected so that coil sections 28a, 28c, and 28e form south poles, and so that winding sections 28b, 28d, and 28f form north poles. When the winding 28 is connected to power, the winding operates in a six pole conventional mode.

Figure 5:
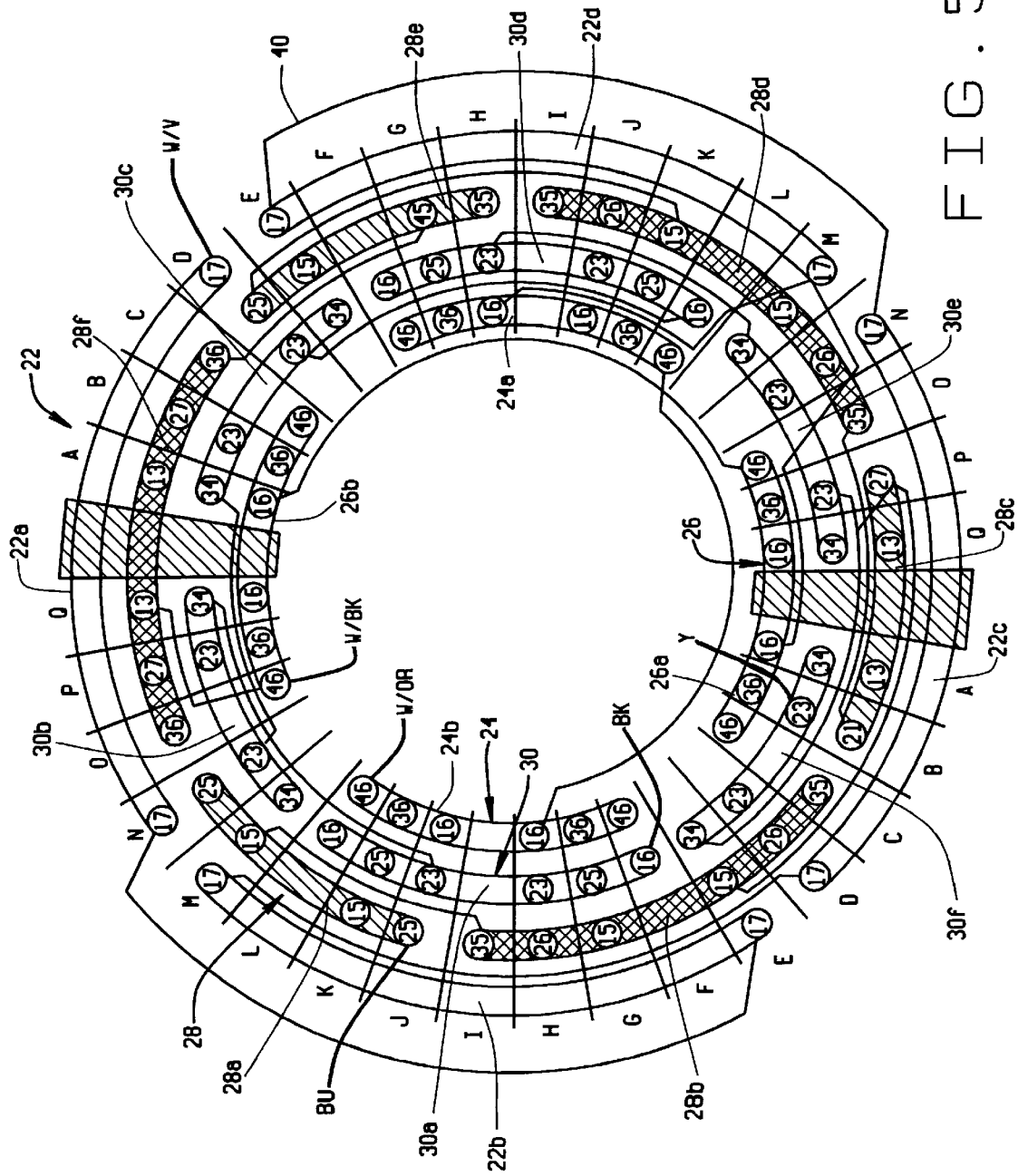
FIG. 5 is a winding diagram of the motor, illustrating the fourth winding connected to operate in a six pole (medium speed) mode.

The fourth winding is connected for operation in the six pole (medium speed) mode when switch 32 is in the 6 pole mode, switch 36 is in the 6/8 pole mode, and switch 34 is in either the 4 pole or 8 pole position. The coil sections are arranged around the circumference of the stator to form alternating poles. This configuration is shown in FIG. 5, in which coil sections forming a north pole are hatched and coil section forming a south pole are cross-hatched.

Figure 6:
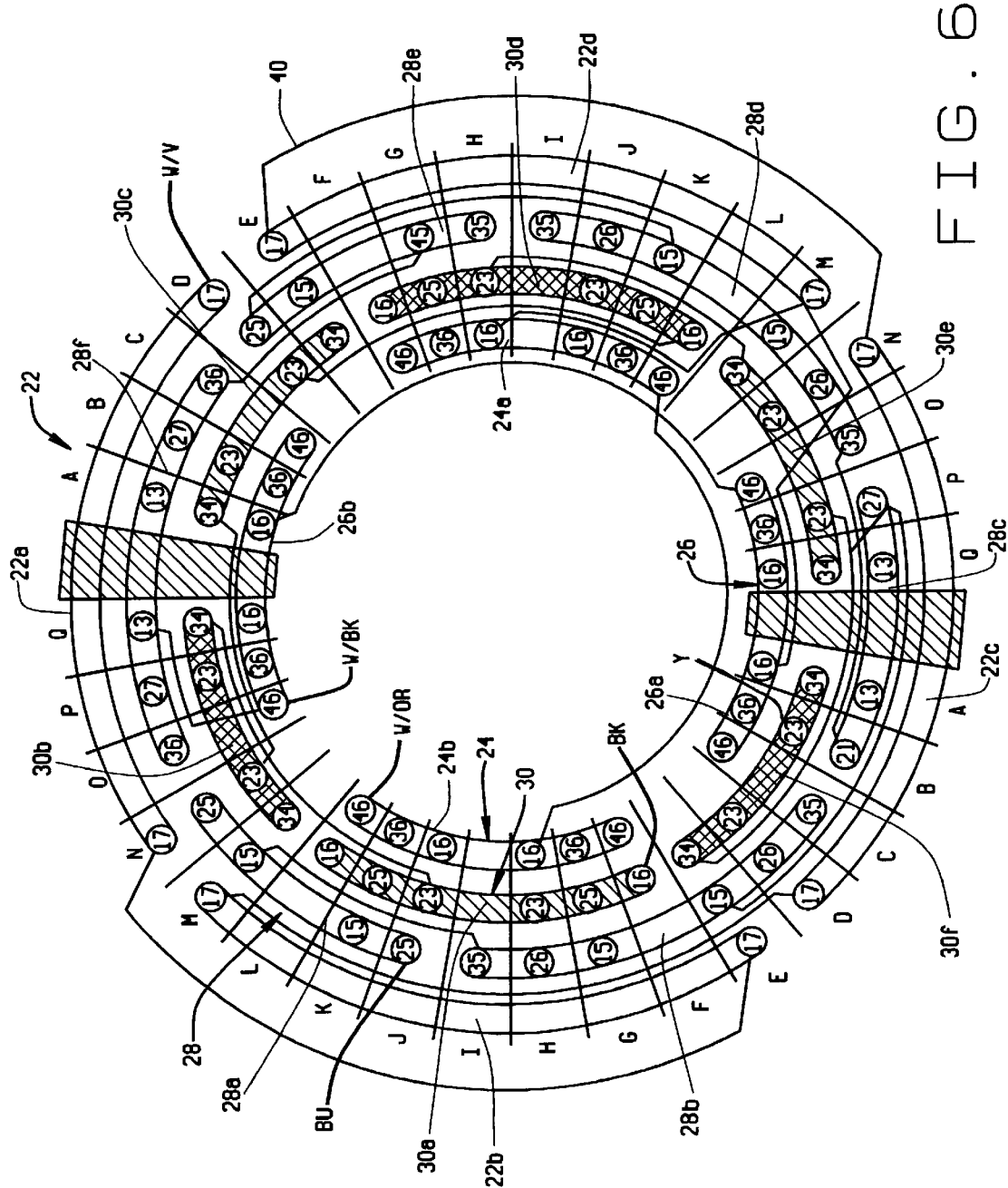
FIG. 6 is a winding diagram of the motor, illustrating the auxiliary winding connected to operate in an six pole starting mode.

Lastly the auxiliary winding 30 comprises coil sections 30a, 30b, 30c, 30d, 30e, and 30f. The coil sections are configured and connected so that winding sections 30a, 30c, and 30e form south poles, and so that winding sections 30b, 30d, and 30f form north poles. When the auxiliary winding 30 and the fourth winding 28 are connected to power, (caused by the operation of the starting switch 38) the winding operates in a six pole conventional mode to start the motor. The coil sections are arranged around the circumference of the stator to form alternating poles. This configuration is shown in FIGS. 5 and 6 in which coil sections forming a north pole are hatched, and the coil sections forming a south pole are cross-hatched. During starting the 6 pole main winding 28 and the 6 pole auxiliary winding 30 are both energized. They are shifted in space by 90 electrical degrees or 30 mechanical degrees.

What is claimed is:

1. A single-phase, three speed induction motor comprising a stator, a rotor rotatably mounted within the stator, the stator comprising a core having a plurality of slots, and a plurality of windings in the slots configurable to operate in four, six, and eight pole modes, the windings comprising:

a first winding having four coil sections;

a second winding having two coil sections;

a third winding having two coil sections;

a fourth winding having six coil sections;

the first, second, and third windings being positioned and connectable to operate in a four-pole conventional mode, and the second and third windings being positioned and connectable to operate in an eight-pole consequent mode.

2. The motor according to claim 1 further comprising an auxiliary winding having six coil sections for starting the motor.

3. A single-phase, three speed induction motor comprising a stator, a rotor rotatably mounted within the stator, the stator comprising a core having a plurality of slots, and a plurality of windings in the slots configurable to operate in four, six, and eight pole modes, the windings comprising:

a first winding having four coil sections spaced in the slots of the stator and configured to create alternating poles;

a second winding having two coil sections, each aligned with opposing coil sections of the first winding;

a third winding having two coil sections, each aligned with opposing coil sections of the first winding;

a fourth winding having six coil sections spaced in the slots of the stator, and arranged to create alternating poles;

a first switch having a 4/8 pole position and a 6 pole position;

a second switch having a 6/8 pole position and a 4 pole position; and a third switch having a 4/6 pole position and an 8 pole position; the switches, when in their respective 4 pole positions connecting first winding in series with the parallel combination of the second and third winding to operate in a four pole conventional mode, and when in their respective eight pole positions connecting the second and third windings in series to operate in an eight pole consequent mode; and when in their respective 6 pole positions connecting the fourth winding to operate in the six pole mode.

4. A single-phase, three speed induction motor comprising a stator, a rotor rotatably mounted within the stator, the stator comprising a core having a plurality of slots, and a plurality of windings in the slots configurable to operate in four, six, and eight pole modes, the windings comprising:

a first winding having four coil sections spaced in the slots of the stator and configured to create alternating poles;

a second winding having two coil sections, each aligned with opposing coil sections of the first winding;

a third winding having two coil sections, each aligned with opposing coil sections of the first winding;

a fourth winding having six coil sections spaced in the slots of the stator, and arranged to create alternating poles;

the first, second, and third windings being configured to be connected to operate in a four pole conventional mode, and the second and third windings being configured to be connected to operate in an eight pole consequent mode.

5. A single-phase, three speed induction motor comprising a stator, a rotor rotatably mounted within the stator, the stator comprising a core having a plurality of slots, and a plurality of windings in the slots configurable to operate in four, six, and eight pole modes, the windings comprising:

a first winding having four coil sections spaced in the slots of the stator and configured to create alternating poles;

a second winding having two coil sections, each aligned with opposing coil sections of the first winding;

a third winding having two coil sections, each aligned with opposing coil sections of the first winding;

a fourth winding having six coil sections spaced in the slots of the stator, and arranged to create alternating poles;

first and second switches for selectively connecting the first winding in series with the parallel combination of the second and third windings to configure the first, second, and third windings to operate in a four pole conventional mode, and for selectively connecting the second and third windings in series to configure the second and third windings to be connected to operate in an eight pole consequent mode.

* * * * *